(12) United States Patent
Warner

(10) Patent No.: US 12,326,216 B2
(45) Date of Patent: Jun. 10, 2025

(54) DOME-TOP TRIPOD SYSTEM

(71) Applicant: Vincent S. Warner, Alpine, UT (US)

(72) Inventor: Vincent S. Warner, Alpine, UT (US)

( * ) Notice: Subject to any disclaimer, the term of this patent is extended or adjusted under 35 U.S.C. 154(b) by 0 days.

(21) Appl. No.: 18/415,360

(22) Filed: Jan. 17, 2024

(65) Prior Publication Data

US 2024/0240747 A1 Jul. 18, 2024

Related U.S. Application Data

(60) Provisional application No. 63/480,166, filed on Jan. 17, 2023.

(51) Int. Cl.
*F16M 11/24* (2006.01)
*F16M 11/16* (2006.01)

(52) U.S. Cl.
CPC .......... *F16M 11/242* (2013.01); *F16M 11/16* (2013.01); *F16M 2200/027* (2013.01)

(58) Field of Classification Search
CPC . F16M 11/242; F16M 11/16; F16M 2200/027
USPC ..................................................... 248/163.1
See application file for complete search history.

(56) References Cited

U.S. PATENT DOCUMENTS

| | | | |
|---|---|---|---|
| 1,894,457 A * | 1/1933 | Zerk | F16M 11/32 248/188.5 |
| 1,897,449 A | 2/1933 | Trowbridge | |
| 2,168,988 A * | 8/1939 | Hultquist | F16M 11/28 248/181.1 |
| 2,463,655 A | 3/1949 | Temple, Jr. | |
| 2,691,501 A | 10/1954 | Spencer | |
| 3,300,165 A | 1/1967 | O'Kane | |
| 4,768,744 A | 9/1988 | Leeds | |
| 5,398,901 A | 3/1995 | Brodmann | |
| 7,364,125 B2 * | 4/2008 | Speggiorin | F16M 11/14 248/182.1 |
| 9,188,843 B2 | 11/2015 | Li | |
| 10,612,719 B2 | 4/2020 | Li | |
| 11,085,576 B2 * | 8/2021 | Li | F16M 11/16 |
| 11,306,862 B1 * | 4/2022 | Ye | F16M 11/14 |
| 2004/0227049 A1 | 11/2004 | Lang | |
| 2007/0090237 A1 | 4/2007 | Hsu | |
| 2010/0019109 A1 | 1/2010 | Liu | |
| 2019/0003635 A1 | 1/2019 | Li | |
| 2020/0292124 A1 | 9/2020 | Li | |
| 2021/0190261 A1 * | 6/2021 | Warner | F16M 11/16 |

FOREIGN PATENT DOCUMENTS

EP 3311061 B1 3/2020

* cited by examiner

*Primary Examiner* — Anita M King
(74) *Attorney, Agent, or Firm* — Dobbin IP Law, P.C.; Geoffrey E. Dobbin

(57) ABSTRACT

Two embodiments of a Dome-Top tripod system adjust reactive force between a domed base and a concave top in two separate methods. Both embodiments feature two interfacing discs, one with a convex interface surface and the other with a mating convex interface surface, which friction lock to hold a payload in place. One features a translatable nut and shaft which then loosens or tightens the friction lock. The other version features a translatable drive nut which interacts with the top disk and loosens and releases the friction lock.

6 Claims, 10 Drawing Sheets

DOME-TOP TRIPOD SYSTEM

CROSS-REFERENCES TO RELATED APPLICATIONS

The present invention claims the benefit of and priority to prior filed U.S. Provisional Application No. 63/480,166, filed on Jan. 17, 2023, and incorporates the same by reference herein in its entirety.

FIELD OF THE INVENTION

The present invention relates to the field of tripods and more particularly relates to an entirely new class of tripod design as it relates to photography, videography, shooting tripods, and industrial equipment such as survey transits, 3D scanners and other related payload systems.

BACKGROUND OF THE INVENTION

For decades, there have been three basic types or classes of tripod designs: 1. the traditional and most common "Center-Tube" style tripod; 2. the "Flat-Top" tripod; and 3. The "Bowl-Top" tripod.

The Center-Tube tripod utilizes a hub which allows a central support to pass vertically there-through. There is usually some form of tightening mechanism which allows the central column support to be extended upwards or downwards through the hub. Some designs will allow the central column to rotate within the hub while others require a specialized head on top of the central column to rotate. These designs do not allow for a ready adjustment of the central column about the Y-axis (vertical axis). Panning may take place on a defined X-Z plane, but any adjustment off of the Y-axis, perpendicular to this plane, must be accomplished by adjusting the legs so that the head on top of the central column is on a new, desired, plane, or by the use of a head with sufficient controls and maneuverability to accommodate movement about the Y-axis. Furthermore, the central column is usually located between the legs when the tripod is stowed, which prevents a full collapse of the legs.

The present invention is most similar to a Bowl-Top Tripod. A Bowl-Top tripod relies on the use of a "leveling base" system that consists of a bowl disk, located above the main frame of the tripod, and a tension or locking handle located below the main frame of the tripod, in-between the tripod legs and remarkably close to the tripod legs' hinge joint area. The proximity of this locking handle, being below the hub and proximate the hinge joint area, is awkward and leg interference can create inconvenient access for the operator to gain access to and adjust the handle quickly and easily for manipulation purposes. Videography usually does not require constant and immediate access, and the Bowl-Top is mostly used during initial tripod set-up, or perhaps to make occasional adjustments. However, when the leveling base is used as a dynamic control system or while being used as a substitute for a traditional tripod-head, not just to serve as a one-time leveler, then constant control is required and the awkwardness of the position of the control handle can be very inconvenient and can become a serious performance limiting feature.

In addition to the deficiency of the locking handle access position, the inherent geometric design of a Bowl-Top tripod necessitates than the legs be sufficiently spaced apart such that a human hand can reach between the legs and into the underside of the tripod frame to allow tension-control adjustments. The wide geometric leg spacing means that Bowl-Top tripods are inherently large in diameter when folded. In industry terms, they have a large "pack diameter."

The inherent geometric design features of a Bowl-Top tripod tend to lead to them being larger and therefor heavier than all other tripod styles. Even though Center-Tube tripods require sufficient leg spacing to accommodate the presence of an adjustable center column, no additional hand clearance is required below the frame, as the center column adjustment feature is normally located above the tripod hub.

Flat-Top tripods have no real leg spacing requirements due to the absence of a Center-Tube and the lack of a locking handle located between the legs. Thus, they generally are very lightweight and have a small pack-diameter. However, Flat-Top tripods require the addition of separate camera head of some sort which adds additional weight and size to the overall system. These various design factors of being large, heavy, and having inconvenient user access can have a significant negative impact on users who require tripods that are stable, lightweight, and compact. This is especially true when a tripod is used outdoors where these factors may matter most.

The present invention creates a class of tripod, which may be called a "Dome-Top" tripod, which solves many of the functional deficiencies inherent in the design and features of the other three classes mentioned above. A Dome-Top tripod most closely resembles the look and functional performance of a Bowl-Top tripod in that it provides easy and quick leveling functionality, is very stable, and has a large load capacity. However, the Dome-Top tripod utilizes an alternate tightening and loosening structure which positions control access above the hub, thereby eliminating the need for additional access clearance under the hub and allowing for a much smaller pack diameter.

SUMMARY OF THE INVENTION

In view of the foregoing disadvantages inherent in the traditional tripods in use today, this invention adds many improvements and benefits not possible with other tripod designs. Inspired by the need to improve on the functionality and performance of the three existing tripod classes, this invention improves on all these deficiencies by creating an entirely new class of tripod that has a smaller pack-diameter, is lighter, stronger, and has greater ergonomic access with two-handed control to all required of the control features.

This is achieved by utilizing some of the basic philosophies of a Bowl-Top tripod but with an entirely novel approach by removing the tension control handle from below and in between the tripod hub/legs and placing a new tension control handle above the tripod hub. Then, the innovative design inverts the bowl (concave) feature of a Bowl-Top tripod and creates a dome (convex) feature above hub. This entirely new tripod class is created that allows for precise dynamic leveling, can function as an independent or integrated tripod-head combination, is smaller, stronger, more lightweight, and with unlimited two-handed ergonomic control access for the user.

The more notable features of the invention have thus been outlined in order that the more detailed description that follows may be better understood and in order that the present contribution to the art may be better appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in several ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions as far as they do not depart from the spirit and scope of the present invention.

BRIEF DESCRIPTION OF THE DRAWINGS

In order to describe the manner in which the above-recited and other advantages and features of the invention can be obtained, a more particular description of the invention briefly described above will be rendered by reference to specific example embodiments thereof which are illustrated in the appended drawings. Understanding that these drawings depict only typical embodiments of the invention and are therefore not to be considered as limiting of its scope, the invention will be described and explained with additional specificity and detail using the accompanying drawings.

LIST OF REFERENCE NUMBERS

Figure 1:
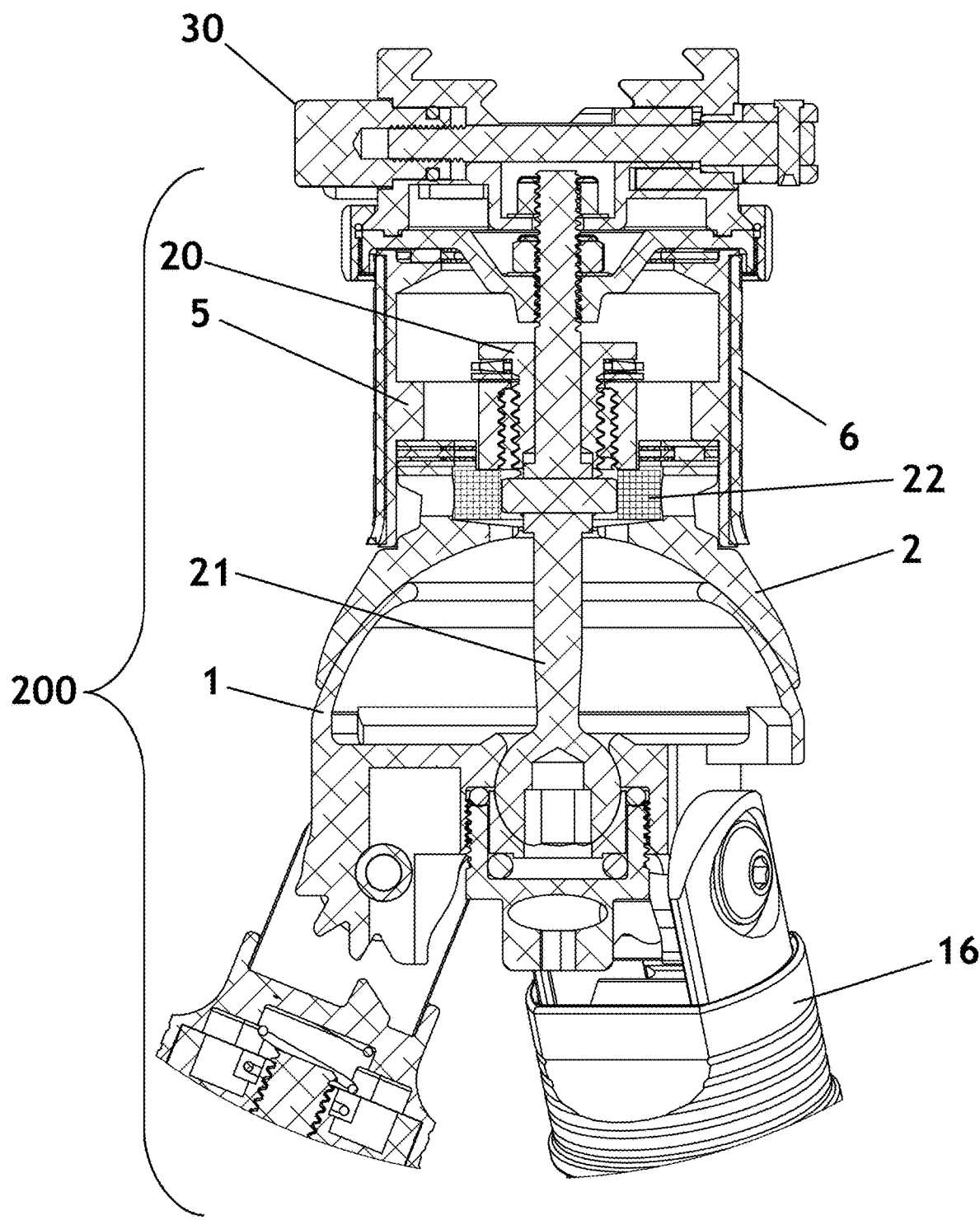
FIG. 1 is a perspective view of one embodiment of a Dome-Top Tripod.
Figure 2:
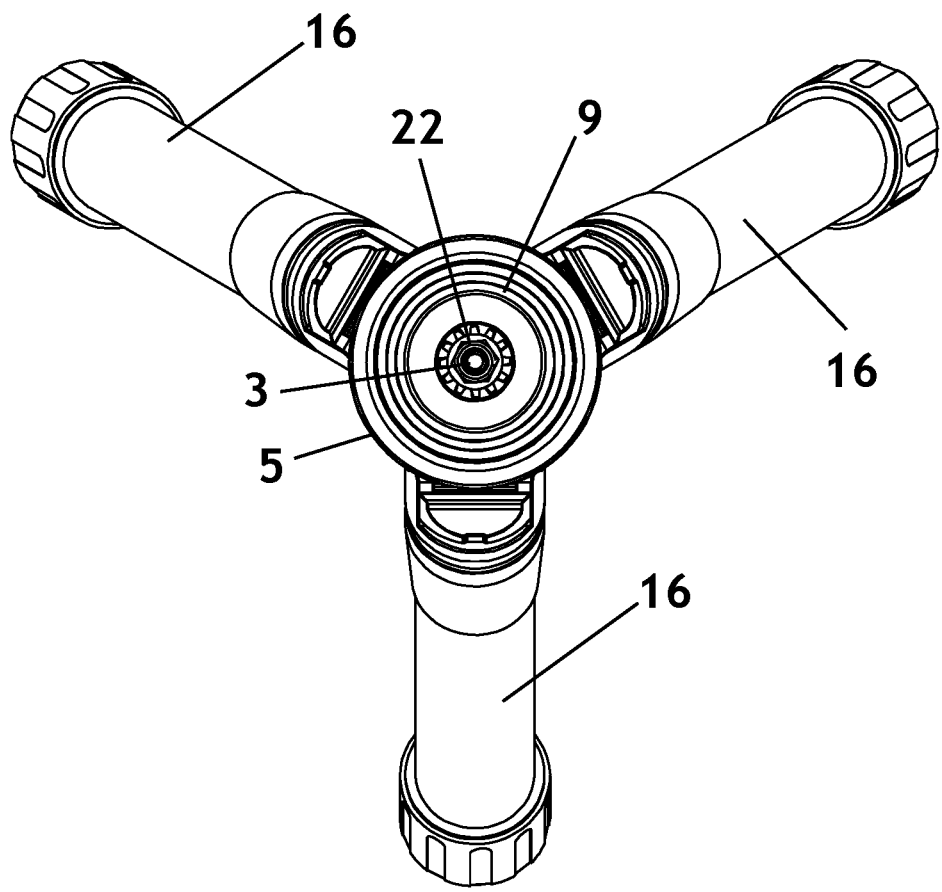
FIG. 2 is a top plan view of the Dome-Top Tripod of FIG. 1.
Figure 3:
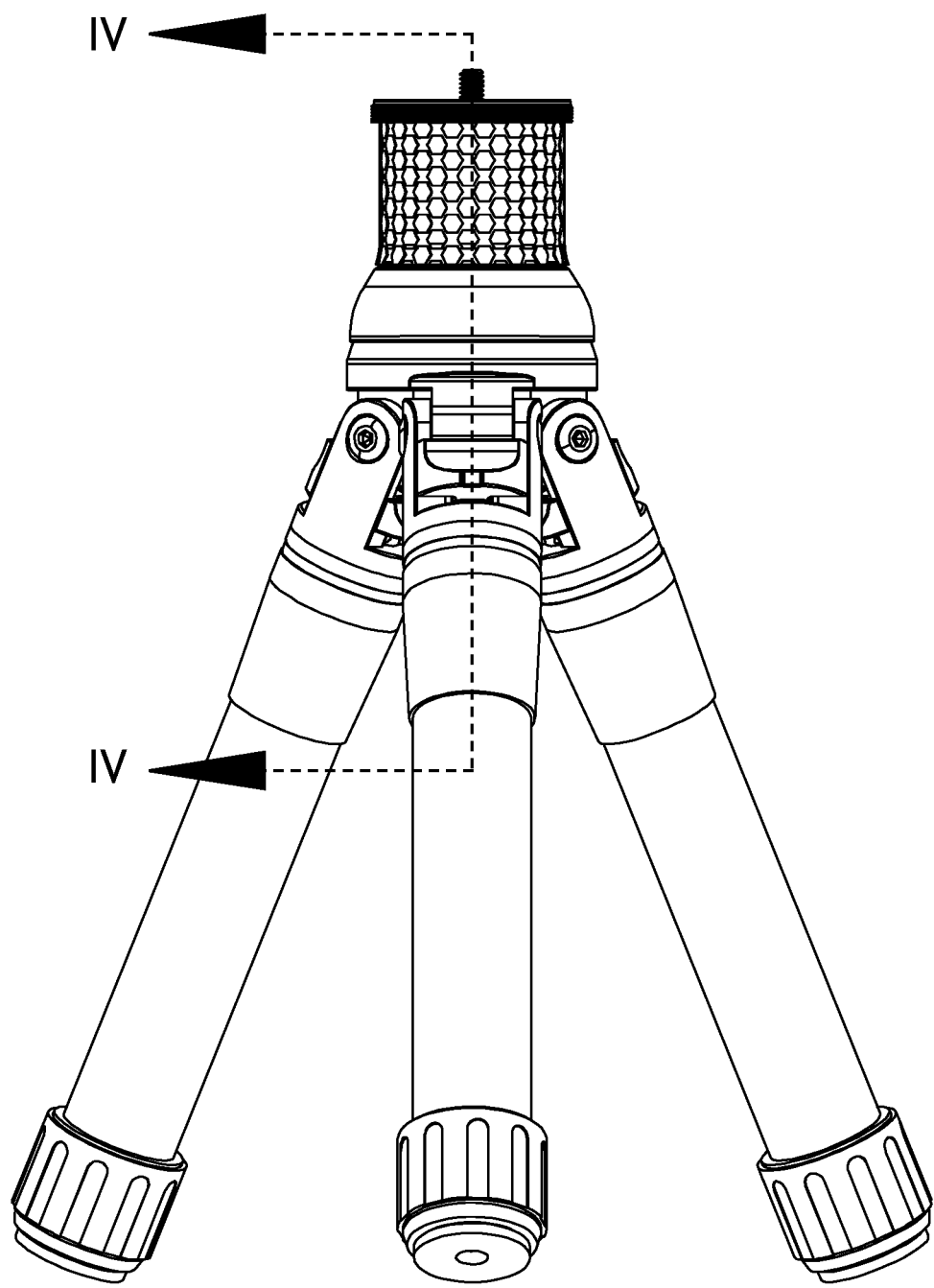
FIG. 3 is a side elevation of the Dome-Top Tripod of FIG. 1.
Figure 4:
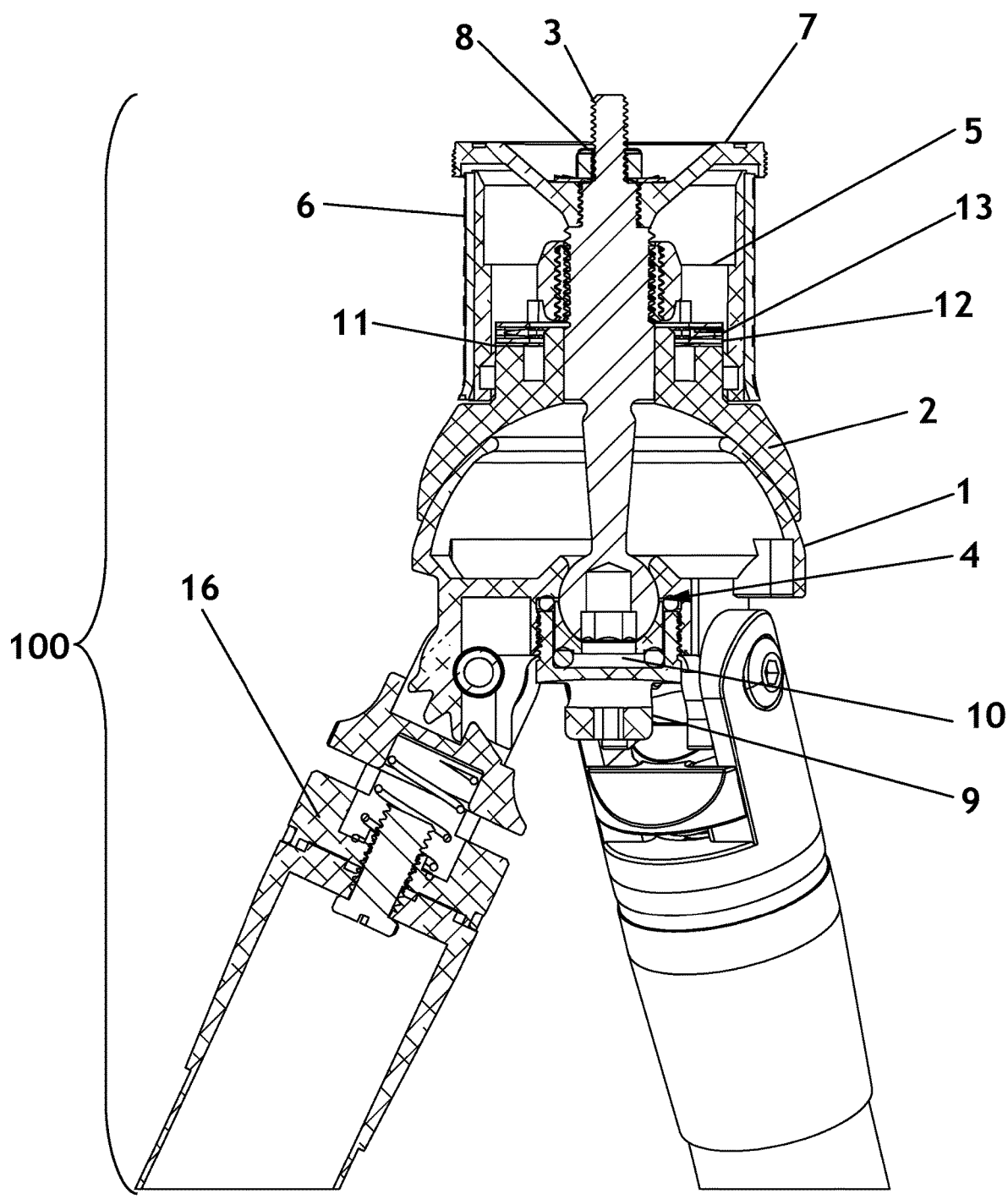
FIG. 4 is a sectional view of the Dome-Top Tripod of FIG. 4, taken along line VI-VI.
Figure 5:
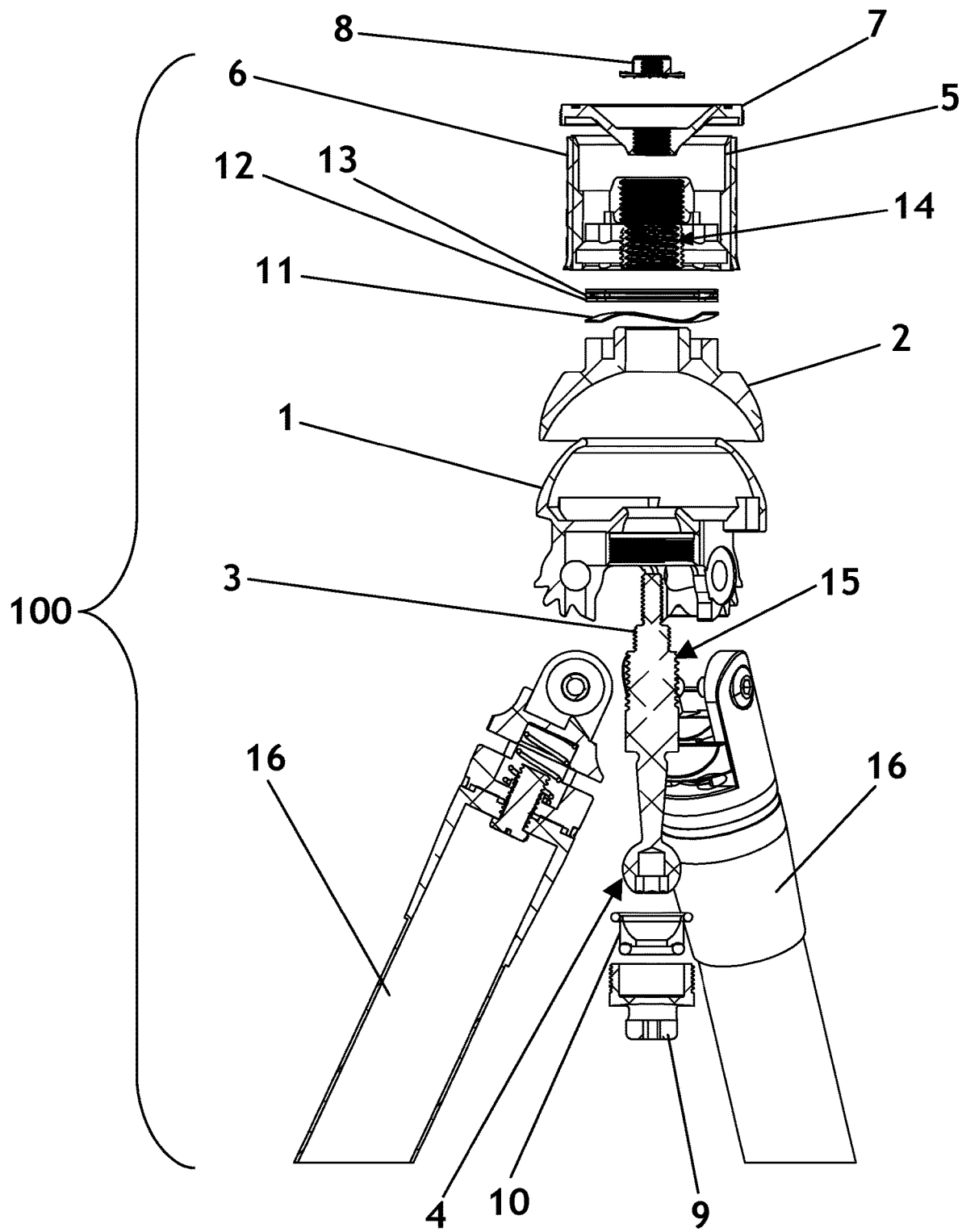
FIG. 5 is an exploded view of the Dome-Top Tripod of FIG. 4.

100—first exemplary embodiment of the tripod head;
1—main base hub;
2—upper dome disk;
3—threaded shaft;
4—ball end of center shaft;
5—tensioner handle;
6—rubberized grip sleeve;
7—top mounting disk;
8—jam nut;
9—base nut;
10—pressure cap;
11—wave washer;
12—washer;
13—thrust bearing;
14—inner handle threads;
15—outer shaft threads;
16—legs;
200—second exemplary embodiment of the tripod head;
20—drive nut;
21—center shaft;
22—bore structure; and,
30—payload.

DETAILED DESCRIPTION OF THE PREFERRED EMBODIMENT

With reference now to the drawings, a preferred embodiment of the tripod system is herein described. It should be noted that the articles "a," "an," and "the," as used in this specification, include plural referents unless the content clearly dictates otherwise. The concept of a Dome-Top tripod may be described in many different embodiments, two of which are described herein.

With reference to FIGS. 1-5, a first embodiment of the Dome-Top tripod 100 utilizes a translating center shaft 3. The primary elements of this first embodiment consists of the main base hub 1 having a domed or convex upper surface and an upper dome disk 2 with a concave reaction surface. A threaded center shaft 3 passes through both domes and a cylindrical tensioner handle 5 positioned coaxially over the domes 1, 2. Main base hub 1 is attached to the legs 16, such that a downward direction is defined as being towards the leg connection while the dome disk 2 is defined as upwards. The center shaft 3 interfaces with a mounting top disk 7 and is held in place on its upper end with a jam nut 8. This top mounting disk 7 is separate from the tensioner handle 5 so that the tensioner handle may move independently with respect to the top mounting disk 7. Texturing, such as that provided by a rubber grip 6, may be provided to tensioner handle 5 to promote positive friction. The opposite end of the center shaft 5 presents a reaction ball surface 4 that is seated in a pre-tensioner pressure cap 10 located on an underside of the main base hub 1 and held in place with a base nut 9, threadingly interfacing with a socket on an underside of the main base hub 1. Handle tensioner compliant members 11, 12, 13 reside between the upper dome disk 2 and tensioner handle 5. These members may be compressible rubber, coil springs, or at least one compressible wave washer 11, such as what is illustrated in the Figures. Additional washers 12 and at least one thrust bearing 13 may also be present between the tensioner handle 5 and upper dome disk 2 to aid in friction reduction and retention while maintaining enough friction to maintain control of the movement of the upper dome disk 2.

In this first embodiment, the user twists the tension adjusting handle 5 clockwise or counterclockwise to tighten and loosen the tension on the complete assembly, which allows the upper dome disk 2 to spin and precess on top of the main base dome 1. When rotating the tensioner handle 5 in the natural clockwise direction, the tensioner handle 5 translates via the interacting threads on the handle and 14 the center shaft 15. This translation affect increases or decreases the tension, and thus friction force, acting between the matching surfaces of the convex main hub dome surface 1 and concave surface of upper dome disk 2. To prevent translation of the center shaft, which would be caused by the pitch of the threads of the main handle, the reaction ball 4 located and the end of the center shaft 3 presses on the pressure cap 10 and nut 9 affixed within in a socket of the main hub dome 1, thus achieving the design clamping force between the hub dome 1 surface and the dome cap 2 surface. Some force induced friction is created between the center shaft ball surface 4 and the hub offset surface of the socket. However, the small diameter of the shaft ball 4 limits the contribution of reactive force achieved from this interaction so that it merely limits the relative spherical movement between the base 1 and upper 2 disks.

Once the proper ratio of the Dome-Top surface and the center shaft surface geometries is achieved and the proper coefficient of friction is balanced, proper function of the entire mechanism is achievable. A critical element of the success of the mechanism is the ability to add additional preload tension of the ball of the center shaft 4. This is achieved by having a second tensioner element, such as pressure cap 10 and the adjustable nut 9, that allows variable tension adjustment on the shaft ball surfaces. Allowing adjustable force by means of various compliant members such as rubber, coil springs, or compressible washers achieves this requirement.

Figure 6:
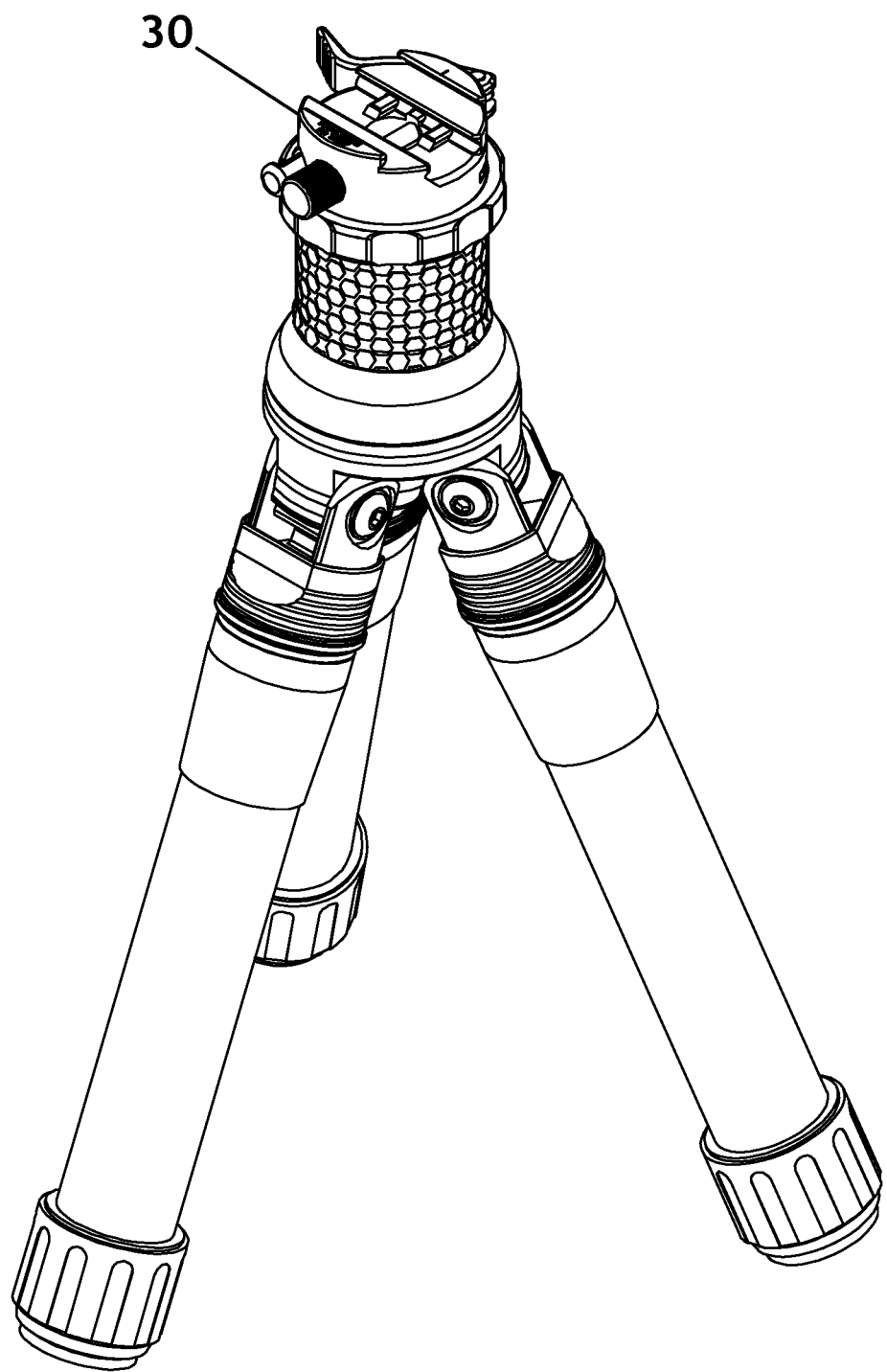
FIG. 6 is a perspective view of an alternate embodiment of a Dome-Top Tripod.
Figure 7:
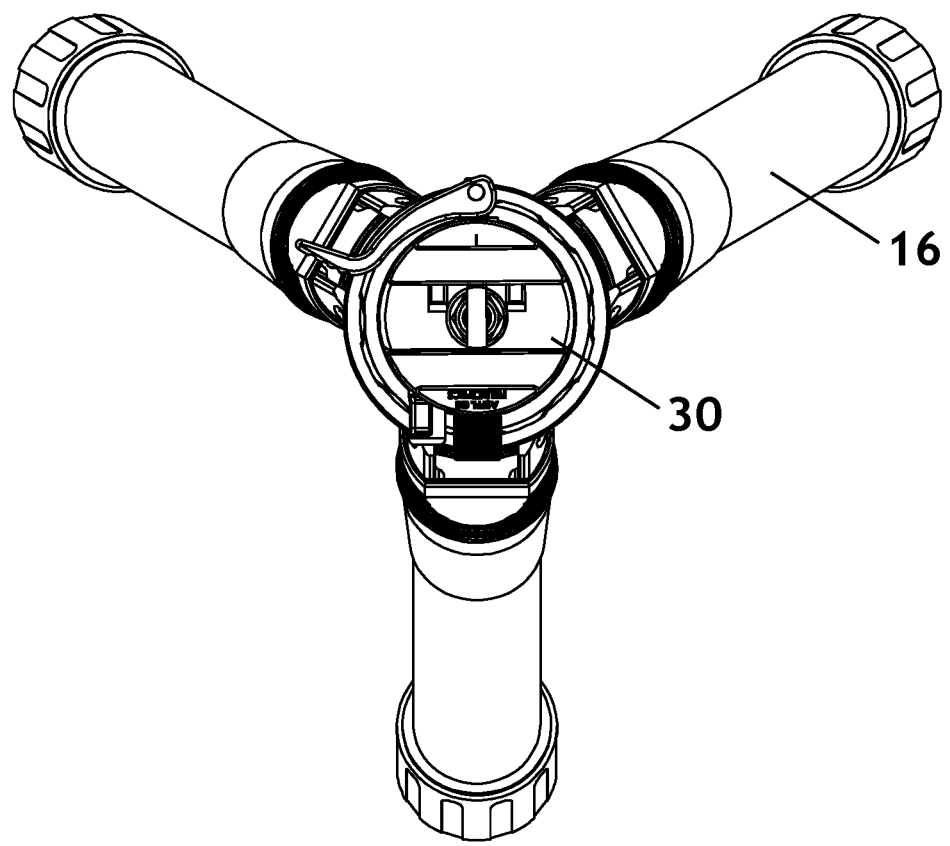
FIG. 7 is a top plan view of the alternate Dome-Top Tripod of FIG. 6.
Figure 8:
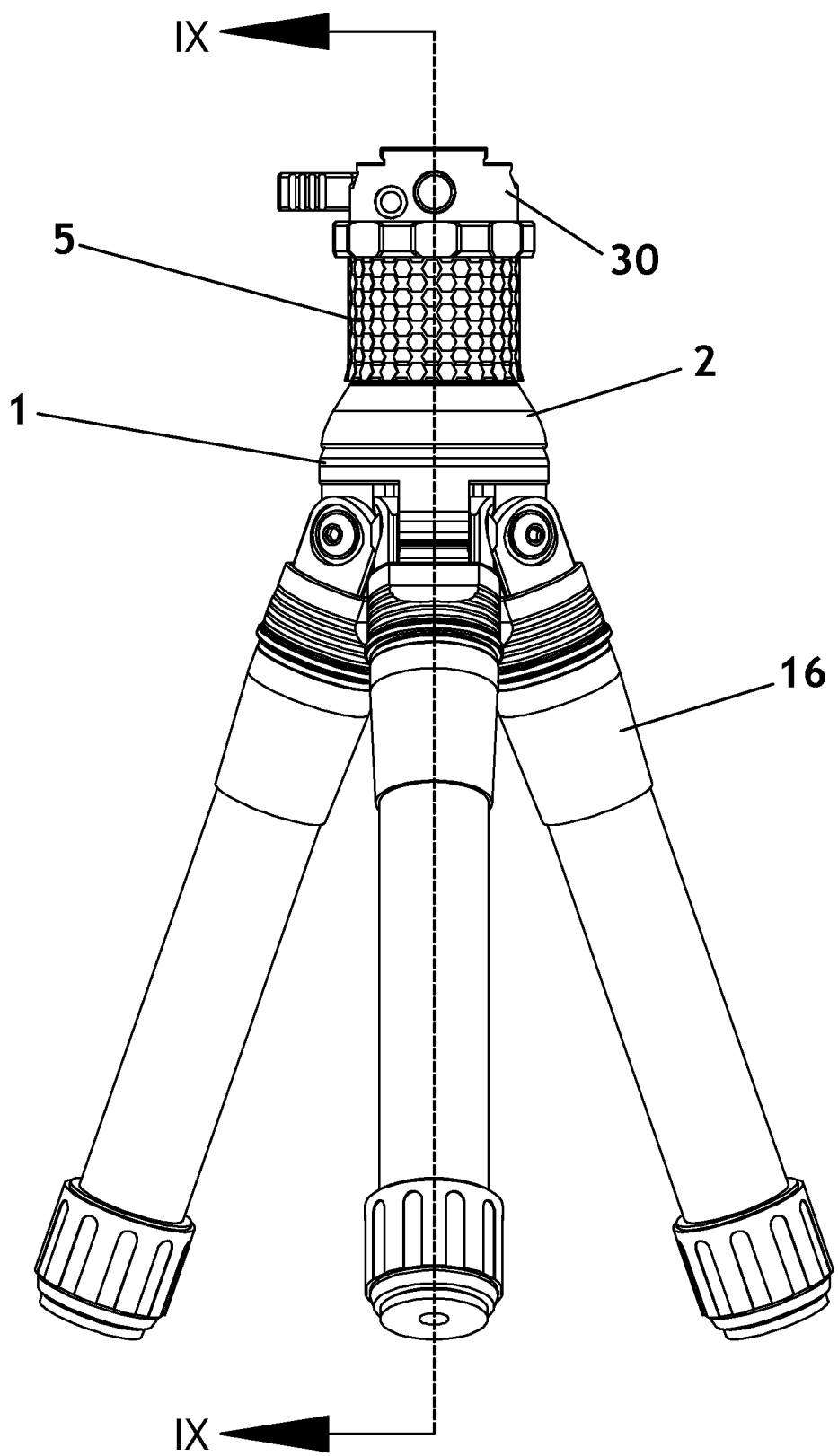
FIG. 8 is a side elevation of the alternate Dome-Top Tripod of FIG. 6.
Figure 9:
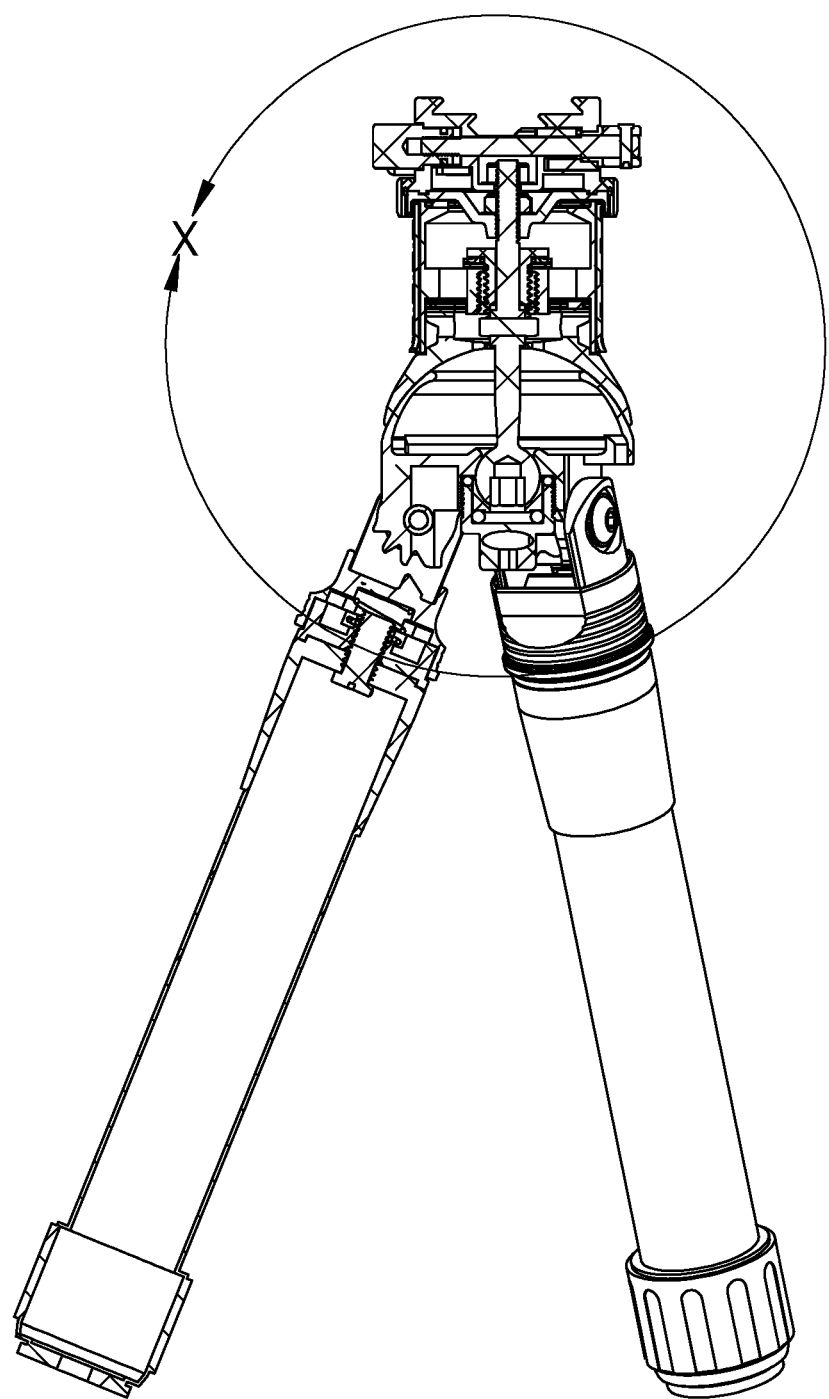
FIG. 9 is a sectional view of the alternate Dome-Top Tripod of FIG. 8, taken alone line IX-IX.

The ultimate goal of the mechanism is to allow the wide sweeping spherical movement of the dome cap disk and its mating components to have controlled movement above the hub dome surface. Once proper control is achieved, additional elements can be attached to top mounting disk 7, such a photography heads, simple clamping jaws, fix systems, gun mounts, and any other desired payload 30 (FIG. 6).

Figure 10:
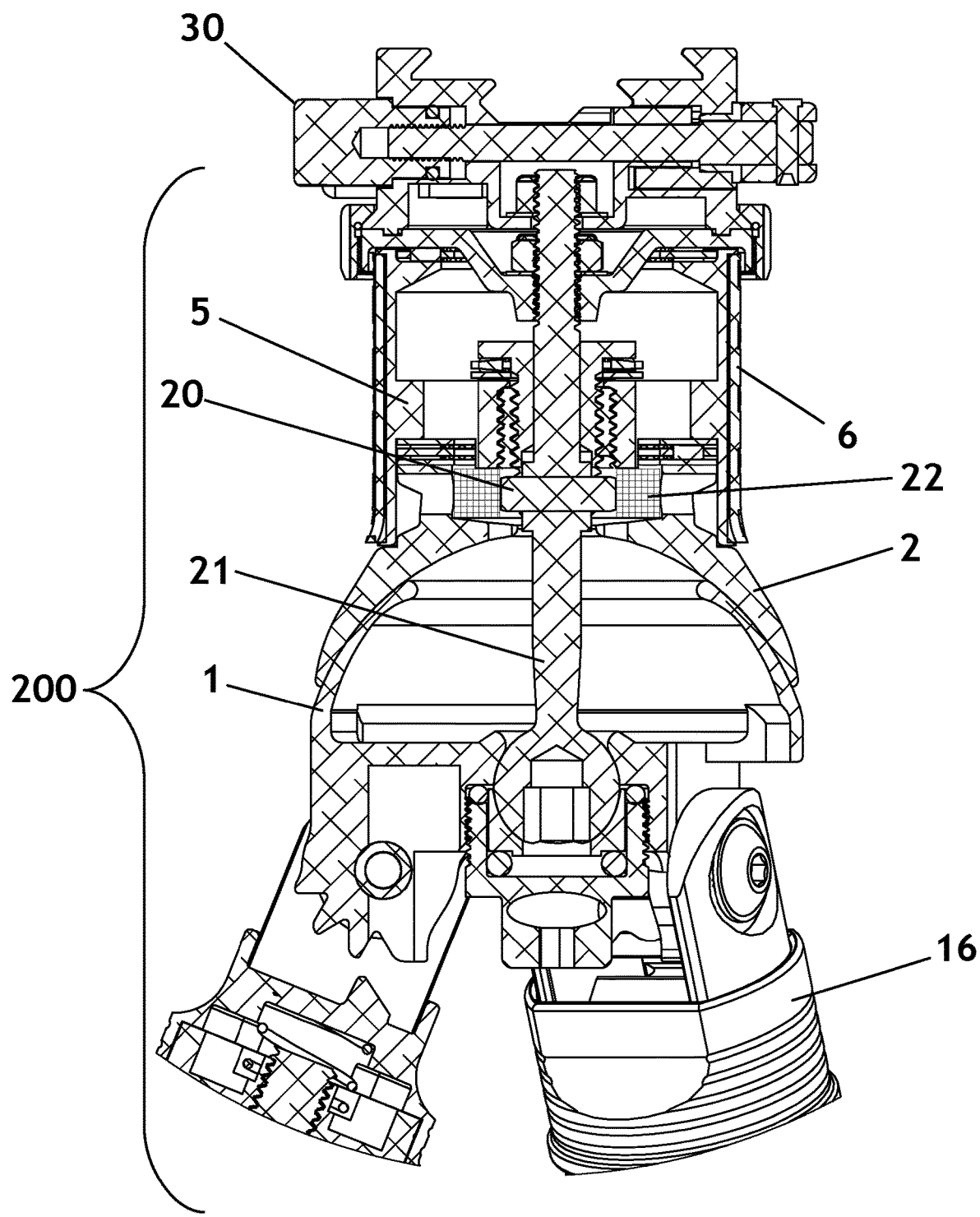
FIG. 10 is a close-up view of the alternate Dome-Top Tripod of FIG. 9, taken in circle X.

A second embodiment (FIGS. 6-10) varies in that rather than the handle rotation and relative translation between the handle and center shaft via the pitch of the shaft/handle thread interaction, a third "drive nut" element can be utilized where rotation of the tensioner handle 5 causes a keyed drive nut 20 (FIG. 10) to translate, guided within a set of smooth bore surfaces interacting between the drive nut 20 and the tensioner handle 5. As the keyed relation restricts the drive nut 20 as it rotates about the threaded center shaft 21, the drive nut 20 will translate up and down within the bore as the threads (wider part of shaft 21) direct it. The translation of the drive nut 20 achieves the same desired force increase and decrease as it interacts with dome disk 2, and thus the friction reaction force between the dome hub 1 and the dome disk 2 surfaces as described in the previous embodiment is achieved. The keyed relationship between the tensioner handle 5 and drive nut 20 can be achieved in many ways other than a bore, created in this embodiment by adding a bore structure 22 which keys against the drive nut 20, such as employing the use of mating splines, grooves, pins, slots, etc. to prevent relative rotation of the two elements. This embodiment adds an ergonomic feature giving the user a more natural reaction of tighten-and-loosen as created by a counter-clockwise vs. clockwise motion by using left-hand threads on the shaft 21 so as to reverse the translation direction of the drive nut 20 from what would have been achieved if using a traditional right-hand thread.

Although the present invention has been described with reference to preferred embodiments, numerous modifications and variations can be made and still the result will come within the scope of the invention. No limitation with respect to the specific embodiments disclosed herein is intended or should be inferred. The invention is adaptable to any type of support used in the fields described in this specification including bipods and monopods, not just tripods, and any form of equipment which may be supported on such devices.

What is claimed is:

1. A dome-top tripod comprising:
a base hub operably connected to at least one leg towards a bottom and having a convex dome on an upper side;
an upper dome disk presenting a concave mating surface for the convex dome;
a tensioner handle located proximate the upper dome disk, opposite the base hub; and
a threaded central shaft running through and extending beyond the base hub, dome disk, and tensioner handle;
wherein rotation of the tensioner handle selectively imparts and releases a friction lock between the base hub and dome disk.

2. The dome-top tripod of claim 1, further comprising:
the threaded central shaft having a ball-shaped lower end;
a pre-tensioner cap abutting the ball-shaped lower end;
a base nut encompassing the pre-tensioner cap and threadingly engaged to a socket on an underside of the base hub.

3. The dome-top tripod of claim 1, further comprising a top mounting disk, abutting but capable of motion independent of the tensioner handle, wherein any payload is mounted abutting the top mounting disk and will be unaffected by twisting of the tensioner handle.

4. The dome-top tripod of claim 1, further comprising at least one handle tensioner compliant member located between the upper dome disk and the tensioner handle.

5. The dome-top tripod of claim 1, the threaded central shaft interfacing with a threaded interior of the tensioner handle such that as the tensioner handle is rotated, the threaded central shaft will translate within the dome-top tripod and reduce friction locking the base hub and upper dome disk together, thereby allowing movement of the upper dome disk relative to the base hub.

6. The dome-top tripod of claim 1, further comprising a drive nut keyed to the tensioner handle and positioned on the threaded central shaft, said drive nut translating as it is rotated by the tensioner handle and interfacing with the dome disk, thereby selectively imparting and releasing the friction lock between the base hub and dome disk.

* * * * *